United States Patent
Lizell

(10) Patent No.: US 6,953,355 B1
(45) Date of Patent: Oct. 11, 2005

(54) MODULAR SUPPORT SYSTEM

(76) Inventor: Christopher A. Lizell, 108 Old Oak Tree Rd., Lansdale, PA (US) 19446

( * ) Notice: Subject to any disclaimer, the term of this patent is extended or adjusted under 35 U.S.C. 154(b) by 511 days.

(21) Appl. No.: 10/075,299

(22) Filed: Feb. 15, 2002

Related U.S. Application Data

(62) Division of application No. 09/323,213, filed on Jun. 1, 1999, now Pat. No. 6,419,511.

(51) Int. Cl.[7] ............................................... H01R 4/60
(52) U.S. Cl. ..................................... 439/210; 174/50.51
(58) Field of Search ................................ 439/207, 210; 174/50.51, 50.55, 60

(56) References Cited

U.S. PATENT DOCUMENTS

| | | | |
|---|---|---|---|
| 2,365,940 A | 12/1944 | Couse ........................... | 296/24 |
| 4,055,206 A | 10/1977 | Griffin ......................... | 144/285 |
| 4,562,987 A | 1/1986 | Leeds et al. ................. | 248/278 |
| 4,634,613 A | 1/1987 | Potter ........................... | 428/20 |
| 4,643,476 A | 2/1987 | Montgerard ................. | 296/24 |
| 4,750,627 A | 6/1988 | Myers ......................... | 211/205 |
| 4,783,036 A | 11/1988 | Vossoughi ............... | 248/281.1 |
| 5,219,081 A | 6/1993 | Lin ............................. | 211/205 |
| 5,236,016 A | * 8/1993 | Vogelsang ................. | 138/115 |
| 5,442,136 A | * 8/1995 | Allen .......................... | 174/95 |
| 5,658,282 A | * 8/1997 | Daw et al. .................. | 606/49 |
| 5,746,334 A | 5/1998 | Brandenberg .............. | 211/205 |
| 5,906,284 A | 5/1999 | Hammerstrom et al. .... | 211/205 |
| 5,931,315 A | 8/1999 | Lorentz et al. ............. | 211/40 |

OTHER PUBLICATIONS

Copy of Office Action Received From European Offince Dated Sep. 9, 2004.
Advertisement in catalog entitled "SKYMALL" Spring of 1999 NEC Technologies pc computing advertisement at www.pccomputing.com/infolink .
VertiWorks advertisement printoujt from internet website http://www.bergdesign.com/vw Ergoflex advertisement printout from internet website.

* cited by examiner

*Primary Examiner*—Thanh-Tam Le
(74) *Attorney, Agent, or Firm*—Pillsbury Winthrop Shaw Pittman LLP

(57) ABSTRACT

A modular support system for use as structure to support wired and unwired equipment with integrated wire management is disclosed. The system includes different parts which can be assembled in a variety of ways to produce different configurations. The system also includes provisions for managing and concealing all of the wires, chords and lines associated with office and entertainment products.

12 Claims, 20 Drawing Sheets

MODULAR SUPPORT SYSTEM

This is a Divisional of prior application Ser. No. 09/323,213, filed Jun. 1, 1999, now U.S. Pat. No. 6,419,511.

BACKGROUND

1. Field of the Invention.

The present invention is directed toward a modular support device. The invention is intended for use as a workstation support structure and allows variable placement of wired equipment and non-wired equipment within a workspace. In addition to wired devices such as personal computer systems, the invention is also useful for supporting various workspace components such as work-surfaces, shelving, and lighting. The invention includes modular components that can be added to form complex support structures meeting various workspace functionality and design objectives. As a modular system, the invention can be used in a wide range of fields and applications. The home office, corporate office, and home entertainment center are examples of where the invention can be applied.

2. Background of the Invention.

Most electronic equipment on the market today is dependent on some kind of structural support for proper user interface and functionality. Computers, monitors, keyboards, computer speakers, scanners, fax machines, and various other electronic equipment common in many homes and offices require proper support for use within a workspace. Except for highly specialized applications, these support devices usually take the form of furnishings or furniture related products and accessories.

Today, workspaces such as corporate office space, home office space, and home entertainment centers are heavily populated with wired devices and equipment. Wired equipment has increasingly become part of the landscape in homes and offices alike. In retrospect, the electronic revolution is a relatively recent development in the long history of the furniture industry, and has placed a great burden upon it in recent times. For centuries, office workers worked with paper and other media with the freedom to position and interface with their work however they chose on their work-surface, a work-surface uncluttered by bulky electronic equipment and tangled wires. The term "wire" as used throughout this specification and claims, includes wires, lines, cables, chords or any other device that can transmit any signal or any form of power, unless otherwise specifically specified or limited.

With the advent of wired input and output devices however, workers were now for the first time in history forced to work in a fixed and stationary position. Due to the relatively recent implementation of such technology, adverse health effects associated with stationary input and output devices have emerged. It has become apparent and widely accepted that working with wired equipment in a stationary or fixed position for extended periods of time can pose health risks to the user. Providing a method for dynamic and variable placement of wired equipment within a workspace allows users the freedom to routinely shift their working positions which can alleviate some of the health risks.

It is widely understood among those skilled in the art that implementing such functionality within a workspace will likely reduce heath risks associated with working in fixed positions for extended periods of time or on a routine basis. The capability to dynamically place and configure wired equipment can also help to better utilize workspace area, thus allowing users to function more effectively and efficiently.

Prior art, such as U.S. Pat. No. 5,746,334, provide for dynamic and variable placement of wired equipment by permitting rotation of attached equipment about a single vertical axis; vertical placement is also variable within defined increments along the vertical length of the support device. Several other patents such as U.S. Pat. Nos. 4,562,987 and 4,783,036 also disclose devices useful for dynamically placing wired equipment, but require a pre-existing workstation for proper functionality. Such devices pose significant drawbacks and limitations when implemented within common workspace environments. The prior art fails to adequately address important workspace issues such as wire management and workspace integration.

Using known devices, achieving adequate ergonomics and wire management within a workspace requires the implementation of untraditional, specialized, and dedicated support devices that are typically very mechanical or unusual in appearance, offering very little if any workspace integration. Though these support devices may be acceptable in some workspace environments, they are often unsuitable for use in most traditional workspace areas. Because of drawbacks like the exposed wire management, poor appearance, and lack of workspace integration, the prior art devices have had limited acceptance and use. Users are therefore deprived of even the basic ergonomic functionality present in the prior art.

It is important for a support device to provide good wire management when placing wired equipment such that wires do not become environmental hazards or detract aesthetically from the workspace and surrounding environment. The appearance of a workspace object may also be significantly altered when wires are not concealed and hidden from view. The prior art does not, and cannot conceal wires. Thus, if wires are managed at all, they must be managed externally with dedicated wire management devices which con sequentially become an external element and feature of the support device, the workstation, and surrounding environment.

Wire exposure always detracts from the aesthetic qualities of a workspace. Exposed wires spoil the efforts of workspace designers and planners who do their best to create an attractive and safe work or entertainment environment. The exposed wires and external wire management systems typical of prior art is simply not acceptable in a significant number of environments.

Wires also can dangerous to people and pets. For instance, a person may trip on a wire resulting in personal injury, or equipment damage. Exposed wires also place children and pets at risk to accidental strangulation or other injuries, or electrocution.

The prior art teaches devices that are intended as a supplement to preexisting workspace equipment, offering little if any workspace integration. That is, they are add-on devices with a one-size-fits-all approach to implementing workspace ergonomics. Such devices thus add to workspace clutter and reduce useable space.

SUMMARY AND OBJECTS OF THE INVENTION

Accordingly, the present invention is directed to a modular support system that substantially obviates one or more of the problems due to the limitations and disadvantages of the related art.

An object of the present invention is to provide a modular support system with integrated wire management.

Another object of the present invention is to provide a modular support system that conceals and protects wires.

Another object of the present invention is to provide a work space environment with minimal wire exposure.

Another object of the present invention is to provide a modular support system that allows dynamic movement of equipment.

Another object of the present invention is to provide a modular support system that allows equipment to be rotated.

Another object of the present invention is to provide a modular support system that allows equipment to be rotated while internally routing wires.

Another object of the present invention is to provide a modular support system that allows any desirable configuration to be assembled using a set of basic building blocks.

Another object of the present invention is to provide a modular support system that is easily expandable and can easily be modified.

Another object of the present invention is to provide a modular support system that is both functional and asthetically pleasing.

Additional features and advantages of the invention well be set forth in the description which follows, and in part will be apparent from the description, or may be learned by practice of the invention. The objectives and other advantages of the invention will be realized and attained by the structure particularly pointed out in the written description and claims as well as the appended drawings.

To achieve these and other advantages and in accordance with the purpose of the present invention, as embodied and broadly described, the modular support system includes a modular support system comprising a column, a cover disposed radially outward of a joining member; the joining member being disposed radially outward of the column, and the joining member associating the cover with the column, wherein the modular support system is capable of concealing and managing wires.

In another aspect the invention includes a modular support system comprising a joining member having an inner portion and an outer portion, the inner portion designed to engage the column, the outer portion having an outer surface, wherein the inner portion is capable of engaging a column, the outer portion is capable of engaging a cover or a support unit, the interior of the joining member is capable of accommodating wires.

In another aspect, the invention includes a kit of parts comprising a column, a joining member having an inner portion and an outer portion, the inner portion having a surface capable of mating with the column and the outer portion having a surface capable of mating with other components, a support unit capable of being mounted on the joining member, a bracket capable of supporting an accessory; and a cover.

It is to be understood that both the foregoing general description and the following detailed description are exemplary and explanitory and are intended to provide further explanation of the invention as claimed.

BRIEF DESCRIPTION OF THE DRAWINGS

The accompanying drawings, which are included to provide a further understanding of the invention and are incorporated in and constitute part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
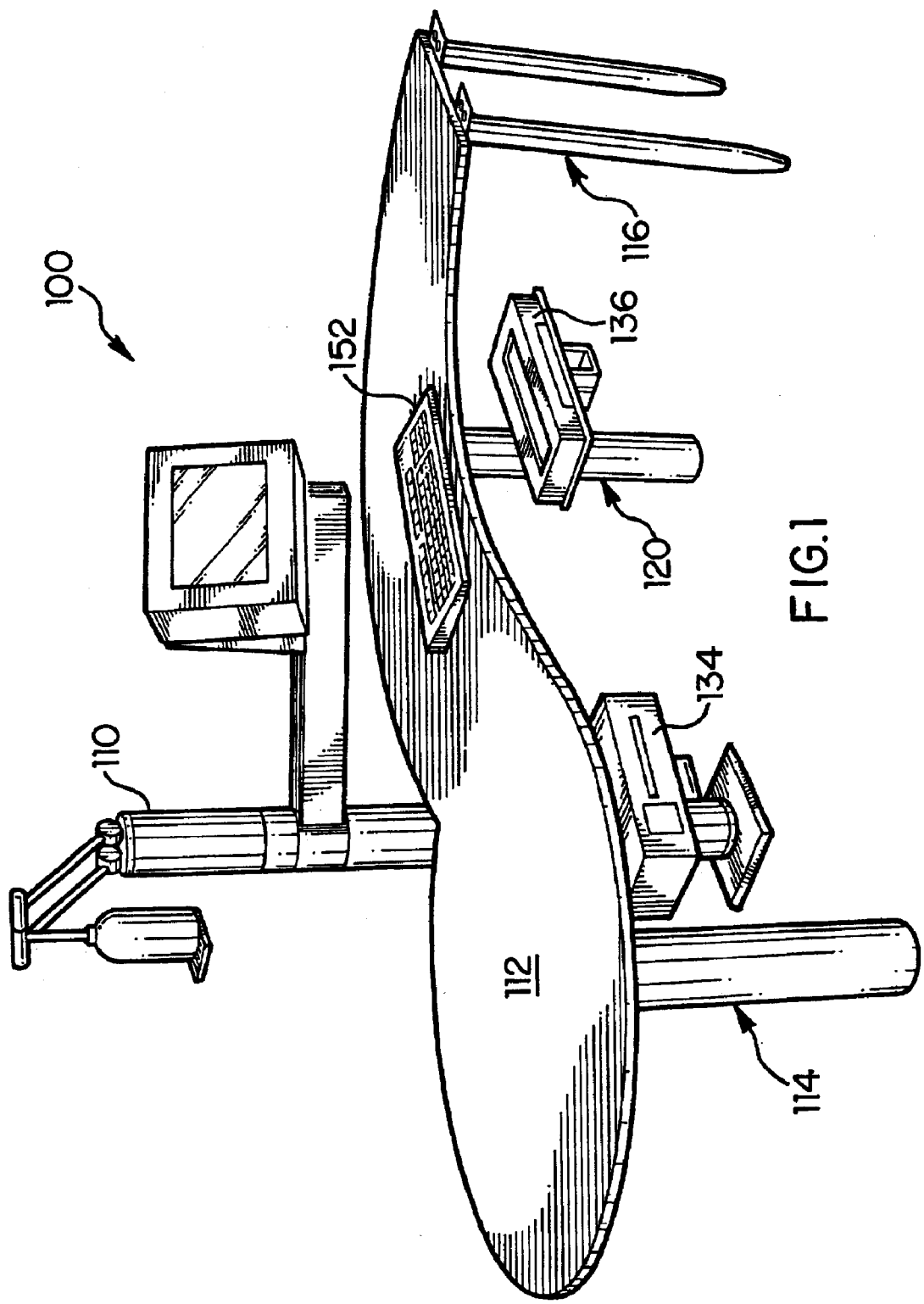
FIG. 1 is a possible configuration of the invention.

The invention includeds a modular support system and the components which make up the system. The system can assume many different configurations. A possible configuration 100 using two modular supports 110 and 120, is shown in FIG. 1. In addition to the two modular supports 110 and 120, the configuration also includes a work surface 112, an additional pedestal leg 114, and a table leg 116. Both the pedestal leg 114 and the table leg 116 can be conventional legs or those legs could be wider and thinner versions, respectively, of the modular support system. The configuration is ergonomically designed for computer use. Accordingly, a monitor 130, a keyboard 132, a CPU 134, and a printer 136 are all properly placed for functional, as well as, aesthetic reasons.

Figure 1A:
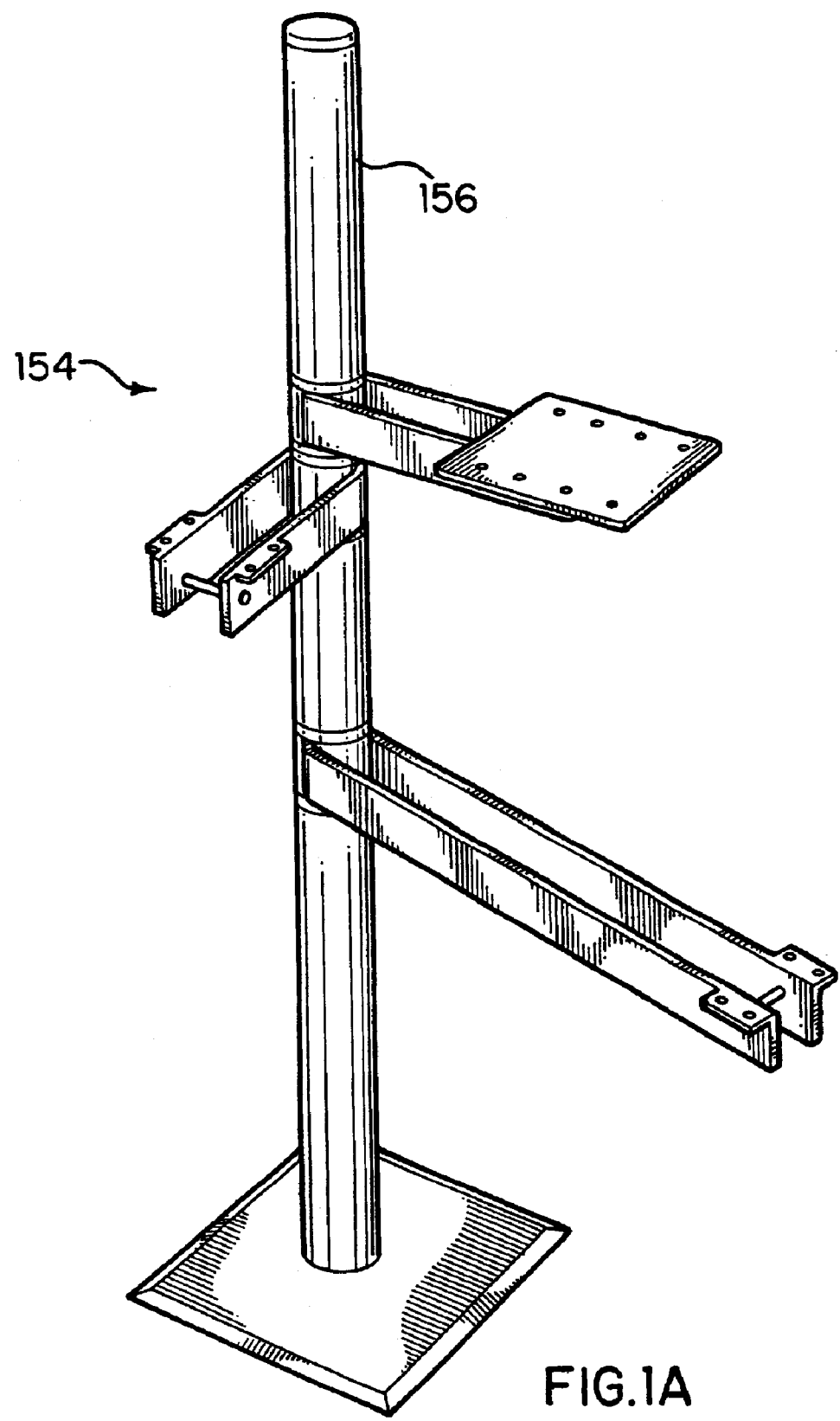
FIG. 1A is a stand alone configuration of the invention.

FIG. 1A shows another possible configuration 154. This configuration includes a single modular support 156 in a stand alone mode.

Figure 2:
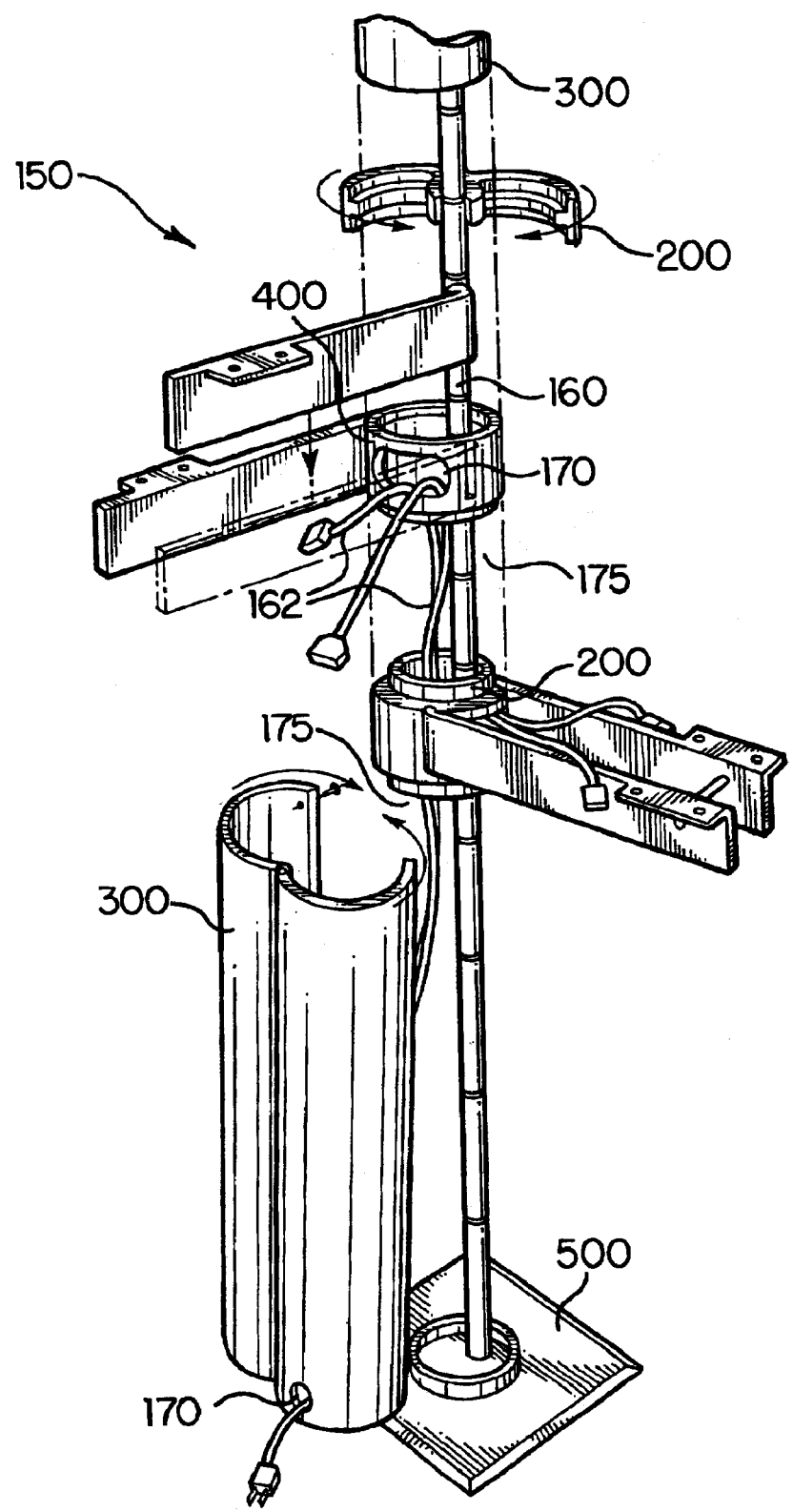
FIG. 2 is an exploded view of the invention.

FIG. 2 shows an exploded view of a modular support 150. Although FIG. 2 shows just one possible exemplary arrangement of a modular support, it should be noted that the invention includes any number of different arrangements of the various parts which make up the modular support and any desired arrangement of those parts is clearly contemplated by the invention.

The modular support 150, starting from the bottom and proceeding to top, includes a foot 500, covers 300, joining members 200, and a support unit 400. These various components of the modular support 150 are all associated in some way to column 160. Column 160 extends longitudinally though a portion of the device. The preferred embodiment, as shown in FIG. 2, contemplates a column 160 that extends throughout the entire length of the modular support 150. These various components will later be discussed in detail. For now, these basic components which make up the modular support 150 help the modular support 150 support various accessories, such as work surfaces, shelving, lighting, and support arms, while at the same time, providing integrated and concealed wire management.

The wire management feature will be discussed in greater detail throughout the remainder of the specification, but as an introduction, notice how, in FIG. 2, the wires 162 run though an internal cavity 175 defined by the covers 300, the joining members 200, and the support unit 400. Notice also, how apertures 170 are made to allow entry and exit of the wires from the internal cavity 175. So, when the modular support 150 is fully assembled, it provides both support for various accessories and an integrated and concealed wire management system.

Figure 3A:
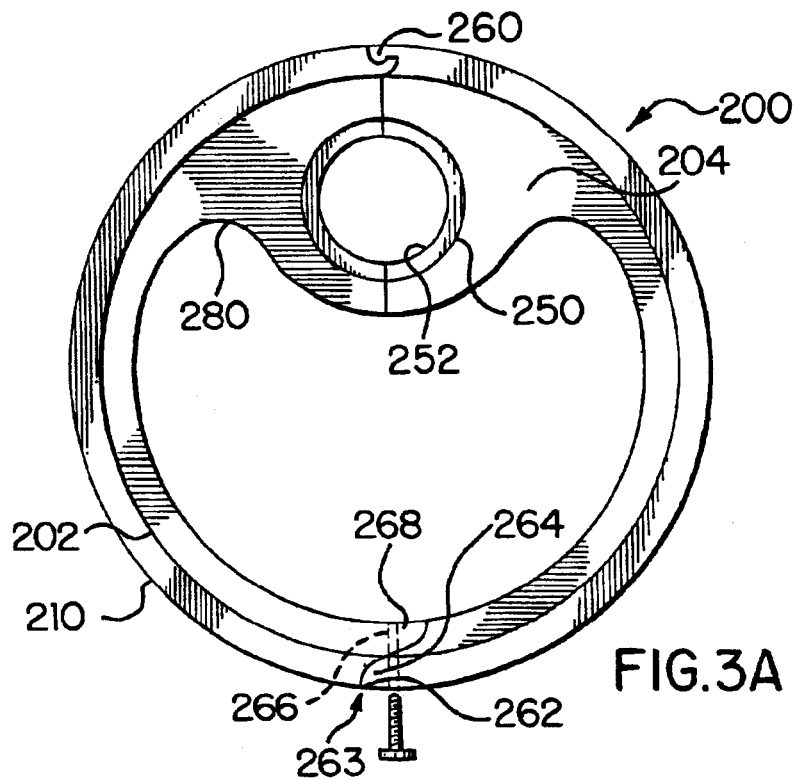
FIG. 3A is a top view of a joining member according to the invention.
Figure 3B:
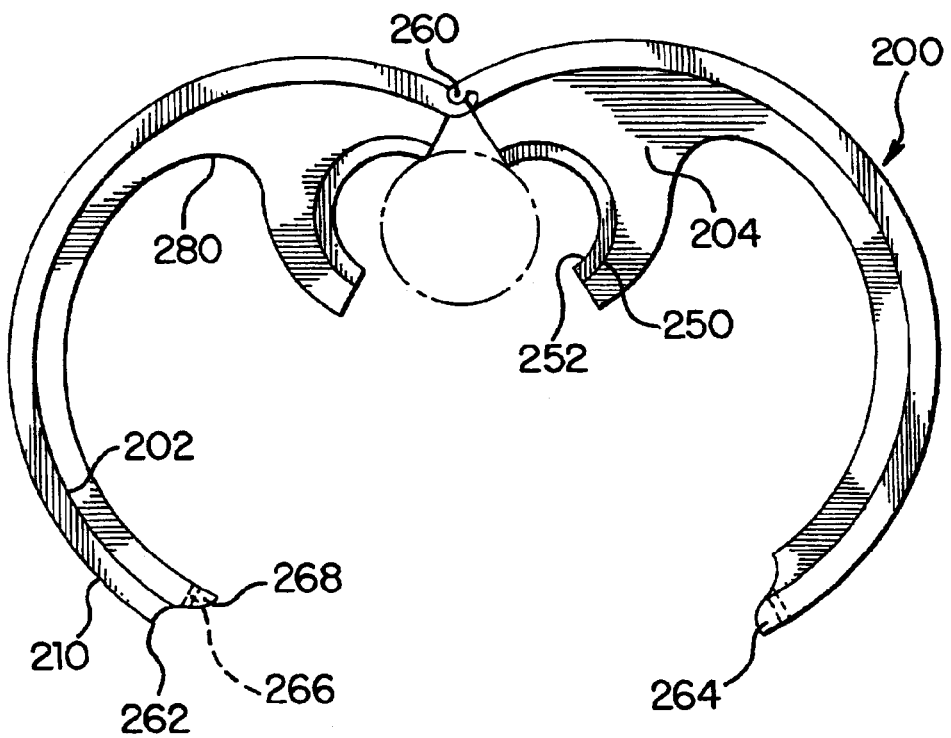
FIG. 3B is a top view of an open joining member according to the invention.

As noted above, all of the various parts of the modular support 150 are associated with the column 160. Preferably, the various parts are rigidly associated with the column 160. An exemplary embodiment of the modular support 150 includes the use of a joining member 200. As shown in FIGS. 2, 3A, and 3B, the joining member 200 is designed to tightly grip the column 160, while at the same time, providing a mounting surface for various other members, for example, the covers 300 and the support unit 400. In other words, the joining member 200 is used to connect various other members to the column 160.

As shown in FIGS. 3A and 3B, which is a top view of a joining member 200, the joining member 200 includes an outer portion 202 and an inner portion 204.

The outer surface 210 of the outer portion 202 is designed to mate with various other members. As shown in FIGS. 4A–E, the outer surface 210 can preferably include projections 212 which mate with various grooves 214 formed on the other members. Also shown in FIGS. 4A–E, are multiple, alternative, shapes of mating surfaces. Clearly, the number of projections and corresponding grooves could be changed as necessary and the geometry of the projections, for example, square or triangular, could also be changed according to preference. The invention also contemplates the use of opposing roughened surfaces, and the use of high friction surfaces. For example, a rubber sleeve could be disposed between the outer member and the joining member 200.

Figure 5:
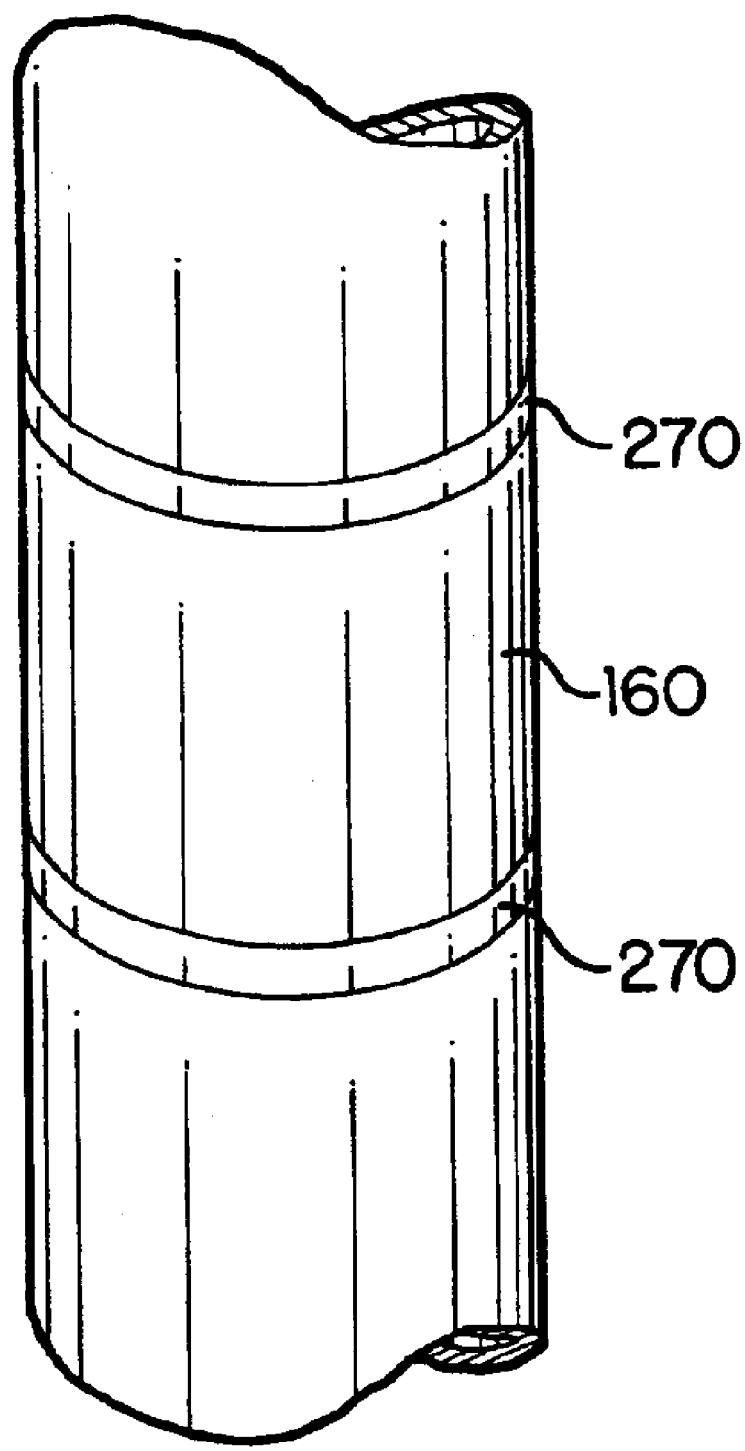
FIG. 5 is an isometric view of a column according to the invention.

Returning to FIGS. 3A and 3B, the inner portion 204 preferably includes provisions for securely holding a column 160 and provisions for guiding wires. The inner portion 204 includes a joining member aperture 250. The joining member aperture 250 is sized to fit snuggly over a column 160. The column, shown in FIG. 2 and FIG. 5, is preferably a standard indexed column with regularly spaced grooves 270 disposed about the axial length of the column 160. An exemplary embodiment of the joining member aperture 250 includes a rib 252, disposed on the inner surface of the joining member aperture 250, that projects radially inward toward the center of the joining member aperture 250, and engages the groove 270 on the column 160, as shown in FIG. 3D. The rib 252 provides additional axial support for the joining member 200 and helps to prevent the joining member from slipping axially along the column 160 under load.

The joining member 200 preferably includes a hinge at some point along the periphery of the joining member 200, and a corresponding opening at another point spaced from the hinge point to allow the joining member to open and close. A hinge 260 is preferably disposed near the inner portion 204. A seam 262 is preferably disposed opposite the hinge 260. The seam 262 can be of any configuration, but a lap joint 263 is preferred where one side 264 of the joining member 200 overlaps the other side 268. A fastening hole 266 is preferably placed in the region of overlap. As shown in FIGS. 3A, 3B, and 3E, the fastening hole 266 preferably extends radially and through the-overlapping portions of both sides 264 and 268 of the joining member.

The fastening hole 266 can also be offset to increase the radial squeezing force of the joining member 200 on column 160. As shown in FIG. 3E, the offset fastening hole 266 is preferably constructed in the following manner. When the joining member 200 is fully closed, the fastening hole 266A on one side 264 does not line up with the fastening hole 266B on the other side 268. In order to align the two portions 266A and 266B of fastening hole 266, the joining member 200 must be squeezed or compressed beyond its normal fully closed condition. When the joining member 200 is sufficiently squeezed, one portion of the fastening hole 266A will align with the other portion of fastening hole 266B thus allowing the insertion of a fastener. Preferably, an elongate fastener would be used, like a tack, nail, rivet, screw, or pin. An exemplary embodiment includes a threaded fastener like a screw, either self tapping or with a corresponding nut.

The inner portion 204 of the joining member 200 also includes a fillet 280. The fillet is smoothly curved, both circumferentially and axially. The fillet 280 prevents wires from getting wedged-or tangled between the inner portion 204 and the outer portion 202. The fillet 280 also helps to keep the wires running in the large interior of the joining member 200.

Figure 3C:
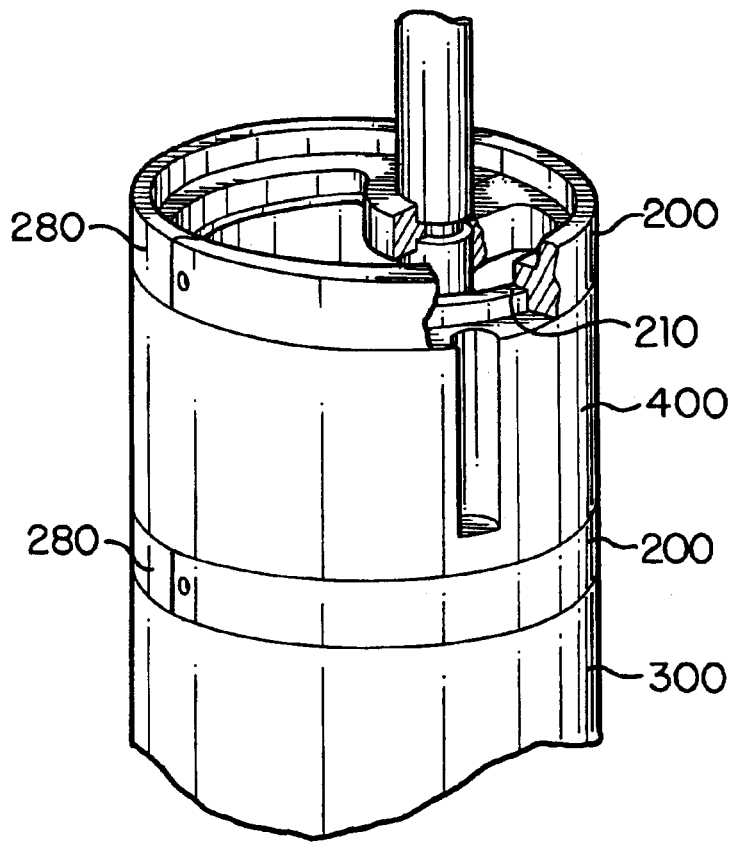
FIG. 3C is an isometric cut out of an embodiment of the joining member and support unit according to the invention.
Figure 3D:
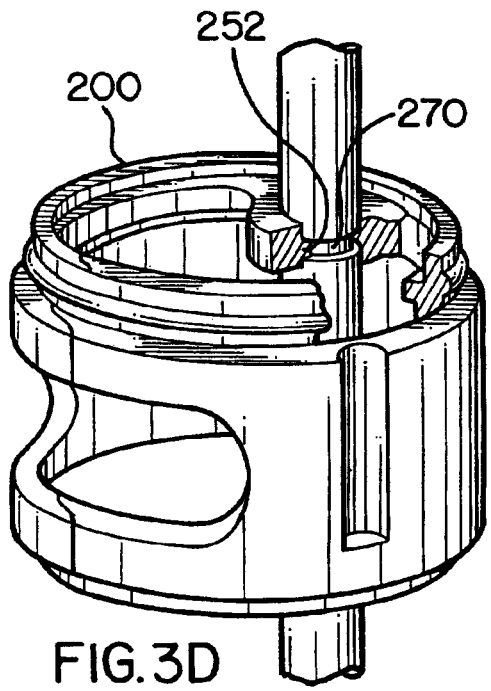
FIG. 3D is an isometric cut out of another embodiment of the joining member and support unit according to the invention.
Figure 3E:
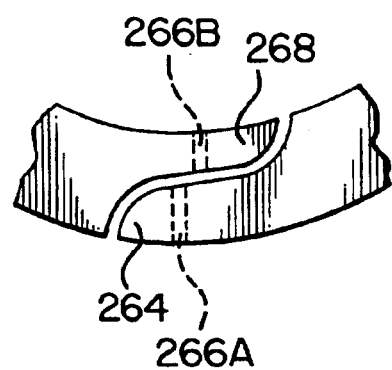
FIG. 3E is an enlarged view of a joint according to the invention.
Figure 4A:
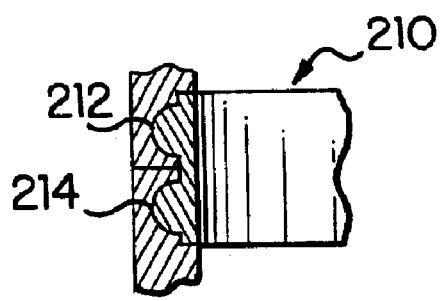
FIG. 4A is a cross sectional view of an embodiment of two corresponding mating surfaces according to the invention.
Figure 4B:
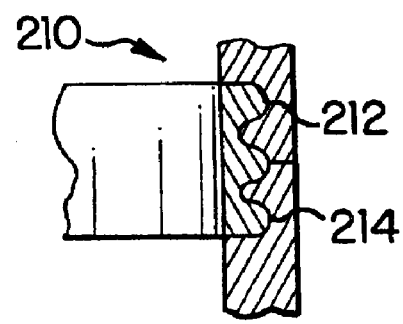
FIG. 4B is a cross sectional view of an embodiment of two corresponding mating surfaces according to the invention.
Figure 4C:
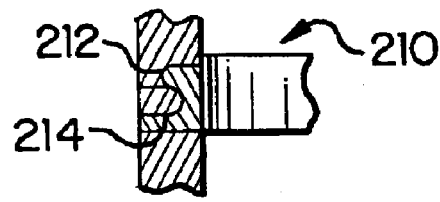
FIG. 4C is a cross sectional view of an embodiment of two corresponding mating surfaces according to the invention.
Figure 4D:
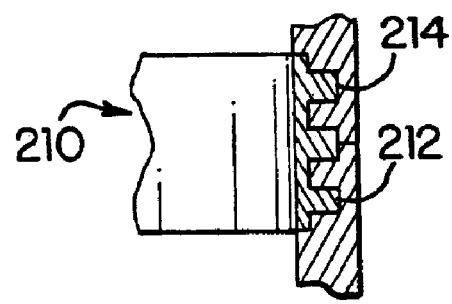
FIG. 4D is a cross sectional view of an embodiment of two corresponding mating surfaces according to the invention.
Figure 4E:
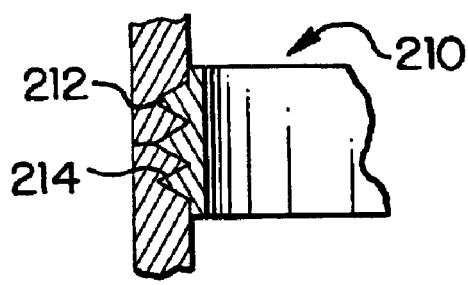
FIG. 4E is a cross sectional view of an embodiment of two corresponding mating surfaces according to the invention.

FIG. 3C shows an alternative embodiment of the invention. In this embodiment, the joining members 200 are radially outward of the support unit 400 and the cover 300.

Correspondingly, the mating surface 210 of this type of joining member faces radially inward, as opposed to radially outward as in the embodiment n shown in FIGS. 3A, 3B, and 3D. This embodiment of the joining member 200 also has a visible surface 280 which is preferably flush with cover 300 and support unit 400. This is in contrast to the other embodiment shown in FIGS. 3A, 3B, and 3D, where no portion of the joining member 200 is visible when the system is assembled.

Figure 6:
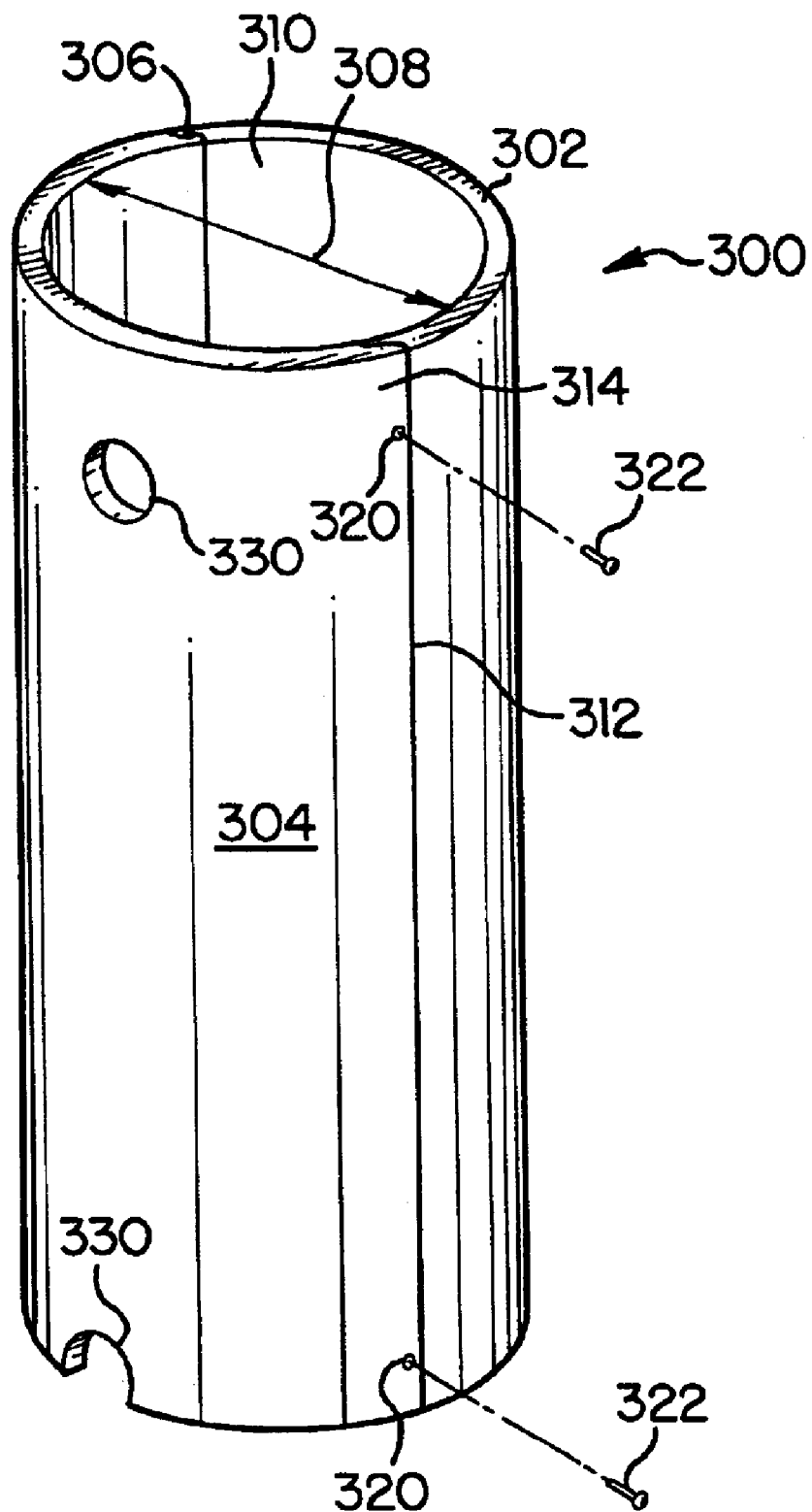
FIG. 6 is a cover according to the invention.
Figure 7:
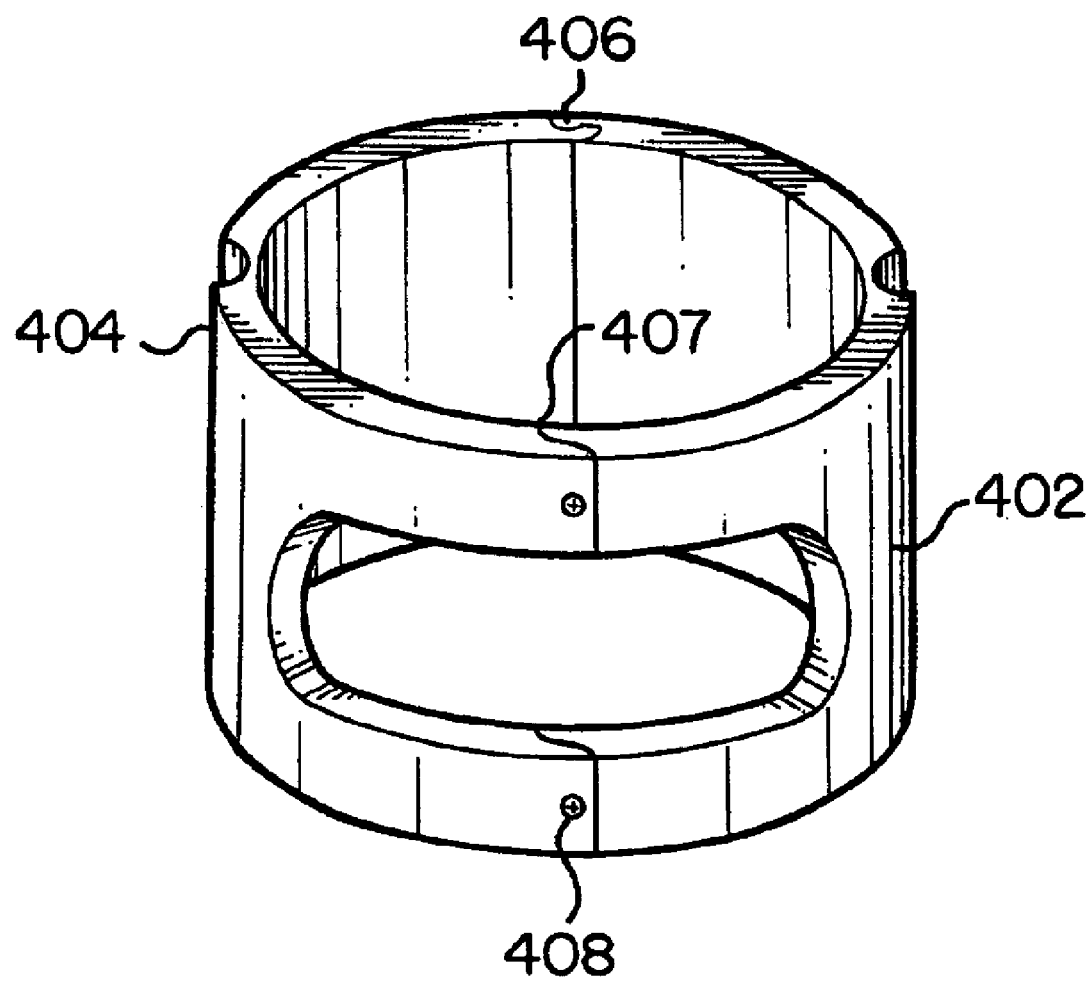
FIG. 7 is a scematic isometric view of a support unit according to the invention.
Figure 8:
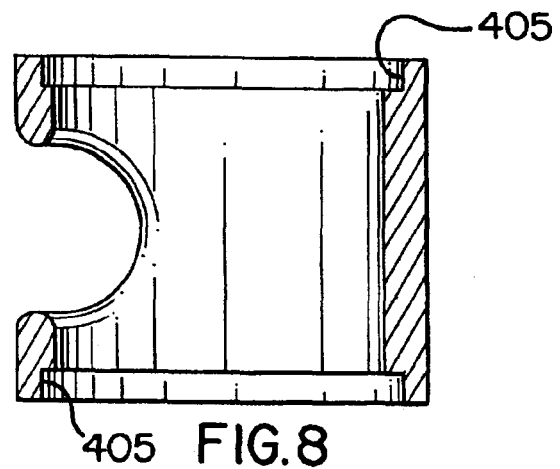
FIG. 8 is a side cross sectional view of a support unit according to the invention.
Figure 9:
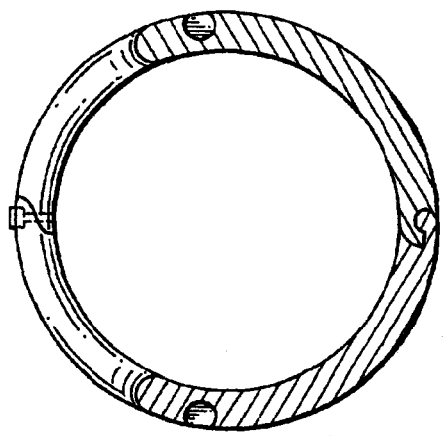
FIG. 9 is a top view of a support unit according to the invention.
Figure 10:
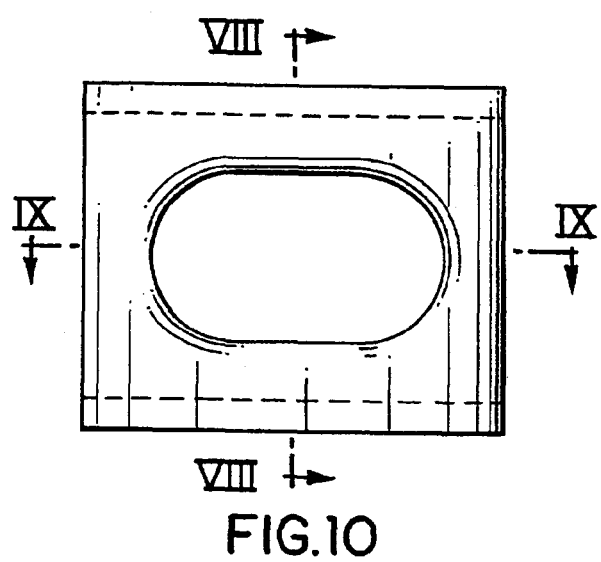
FIG. 10 is a front view of a support unit according to the invention.

FIG. 6 shows a preferred embodiment of a cover 300. The cover 300 can be formed as any suitable shape, but the preferred shape is cylindrical. Preferably, the cover 300, which can vary in length, is constructed as two parts 302 and 304, and joined by a hinge 306. The cover 300 has an inner diameter 308 designed to match the outer diameter of the joining member 200. Preferably, the inner surface 310 has a suitable number and configuration of grooves and/or projections as shown in FIGS. 4A–E to mate with the outer surface of joining member 200. The seam 312 opposite the hinge 308 can be joined in any suitable way. Preferably however, the cover has an offset overlapping joint 314 similar to that disclosed above for the preferred joining member 200. The invention contemplates the use of at least one fastening aperture 320 and corresponding fastener 322 for the cover seam 312. The cover 300 can also include cover apertures 330 of any suitable size or shape to accommodate the entry and exit of wires from the interior of the cover to the exterior.

The support unit 400, shown in FIGS. 7–10, performs several functions. It allows the attachment of several items and provides integrated wire management and concealment to and from those items. The support unit 400, shown in FIGS. 7–10, is preferably similar in construction to the joining member 200 and the cover 300. The support unit 400 can preferably include two portions 402 and 404. Preferably, these two portions bilaterally divide the support unit 400 in half and preferably include a hinge 406 and an opposing seam 408.

While the exterior of the support unit can assume any desired shape, a portion 405 (see FIG. 8) of the interior of the support unit 400 is preferably designed to mate with the exterior of the joining member 200 in an manner similar to the way the cover 300 mates with the exterior of the joining member 200, as previously disclosed: See FIGS. 3C and 3D. For clarity, those mating portions are not shown in FIGS. 7 and 11.

Preferably, the seam 407 can have two designs, one being similar to the offset overlapping joint previously disclosed for the joining member and the cover 300 or, the second, being similar in design as the overlapped joint previously disclosed for both the joining member 200 and the cover 300, but with one exception: the support unit 400 seam 407 is preferably not offset. In other words, when the support unit 400 is in its fully closed condition, then the two portions of the fastening aperture 408 which are disposed in portions 402 and 404 are aligned. Both the cover 300 and the joining member 200 are preferably squeezed beyond their respective fully closed positions to tightly grip their associated supports. However, the support unit 400, in contrast, snuggly fits around an associated joining member 200 without tightly gripping the joining member 200. This allows the support member 400 to rotate. Of course, if rotation is not desirable, and a fixed rotation support unit 400 is needed, an offset, overlapped version of the joint would be used.

A preferred embodiment of the invention also contemplates provisions for attaching accessories to the modular support 150. Preferably, brackets would extend outward from the modular support 150 to hold various objects. The brackets can be attached to any of the parts of the modular support 150. An exemplary embodiment of the invention, shown in FIG. 11, contemplates at least one bracket 500 attached to the support unit 400. Preferably, the bracket 500 is constructed of two bracket arms 502 and 504. The bracket arms 502 and 504 each terminate in a respective mounting member 506 and 508. The mounting members 506 and 508 are designed to mount onto the support member 400. Preferably, the support member 400 includes provisions for accommodating mounting members 506 and 508. The invention prefers the use of a receiver 420 to accommodate mounting member 506 and second receiver 422 to accommodate mounting member 508. The receivers 420 and 422 can also include a shoulder 424 (the shoulder of receiver 422 is hidden and not shown, but is similar in design to shoulder 424). The shoulder 424 helps to prevent the bracket 500 from slipping with respect to the support unit 400.

Figure 11:
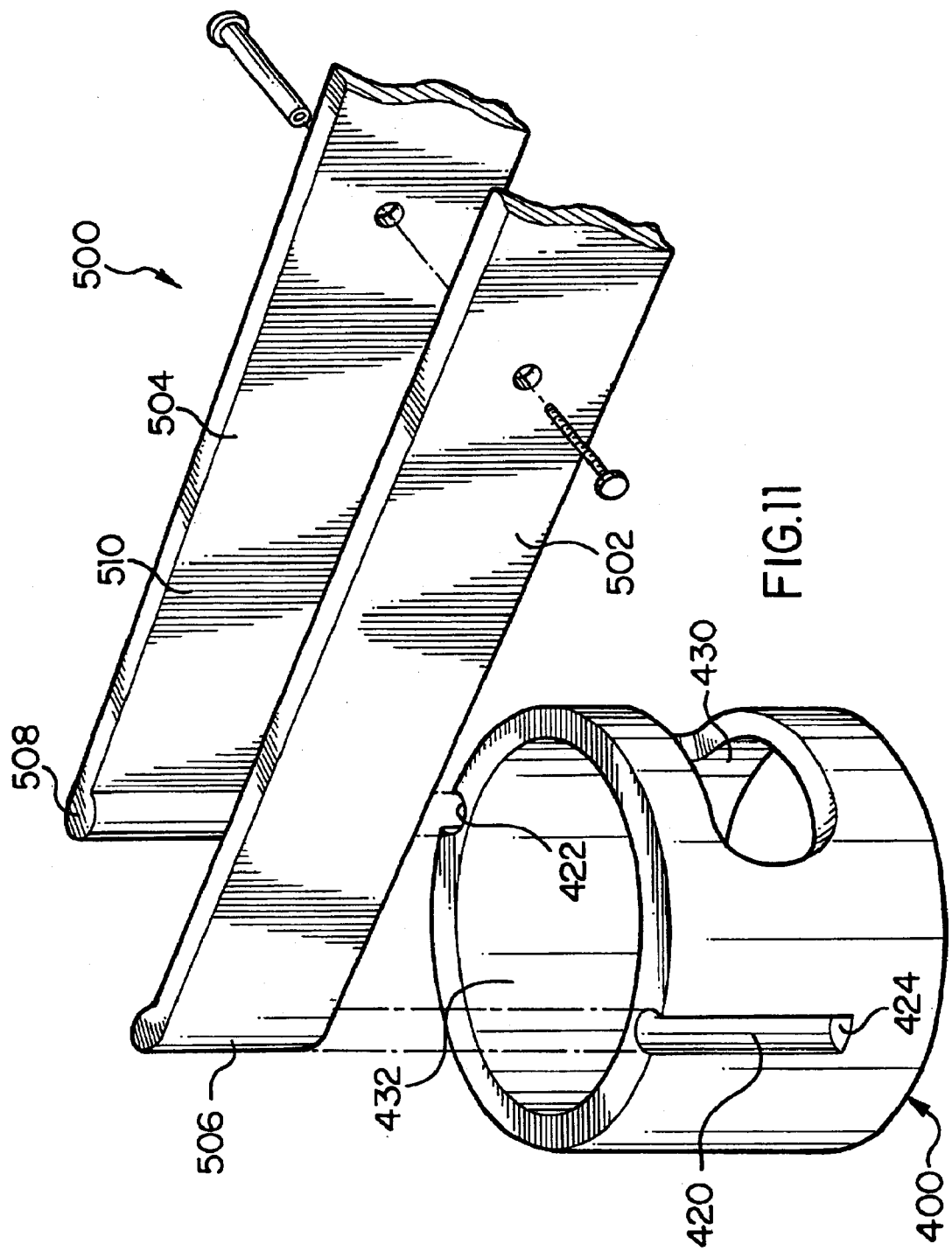
FIG. 11 is an exploded isometric view of a support unit and a bracket according to the invention.

FIGS. 12A–F show an exemplary embodiment of the invention which includes provisions for pivoting the bracket 500 in place. The mounting members 506 and 508 are designed to enter receivers 420 and 422 in the manner shown in FIG. 12A. Although FIGS. 12A–F show an apparently oval mounting member 508 and although an oval mounting member 508 could be used, the invention preferably uses the mounting members 506 and 508 which are circular with a flattened portion. The apparent oval shape in FIGS. 12A–F is an exaggerated shape which shows the principle of the invention more clearly than the preferred flattened circular shape. FIGS. 12A–F show assembly views and enlarged views of the interaction between bracket arm 504 and receiver 422. Bracket arm 502 and receiver 420 would experience a similar interaction. The bracket 504 is fed radially into the receiver 422 and then is pivoted. This pivoting motion forces the wider portions of the mounting member 508 to engage the walls of receiver 422. This has the effect of tightly engaging bracket arm 504 to support unit 400. The bracket arms 502 and 504 could also be slid vertically into receivers 420 and 422, respectively, as shown in FIG. 11. The two brackets 506 and 508 are then bolted together at any suitable location radially outward of the support unit 400. FIG. 11 shows the mounting members 506 and 508 in a radially outwardly facing condition. This orientation is opposite the orientation shown in FIGS. 12A–F. The invention contemplates the use of both orientations, but prefers the orientation shown in FIGS. 12A–F because that orientation results in a smoother, more integrated look when the bracket 500 is attached to the support unit 400.

The receivers 420 and 422 are preferably disposed on either side of opening 430. This configuration allows the support member interior 432 to communicate with the bracket interior 510. Thus, wires and lines running through the bracket interior 510 can enter and exit the support member interior 432 via the opening 430.

Figure 12A:
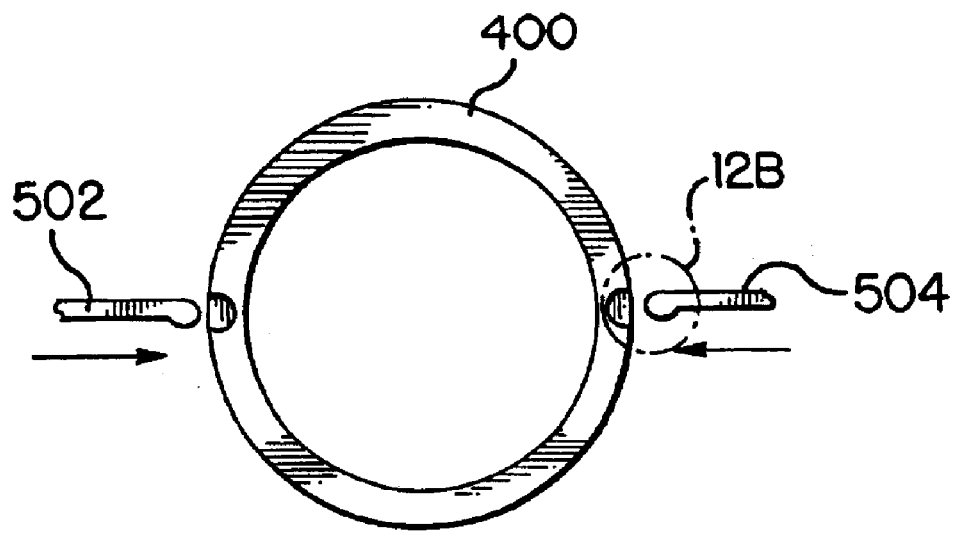
FIGS. 12A–F are views of a bracket and a support unit in various states of assembly according to the invention.
Figure 12B:
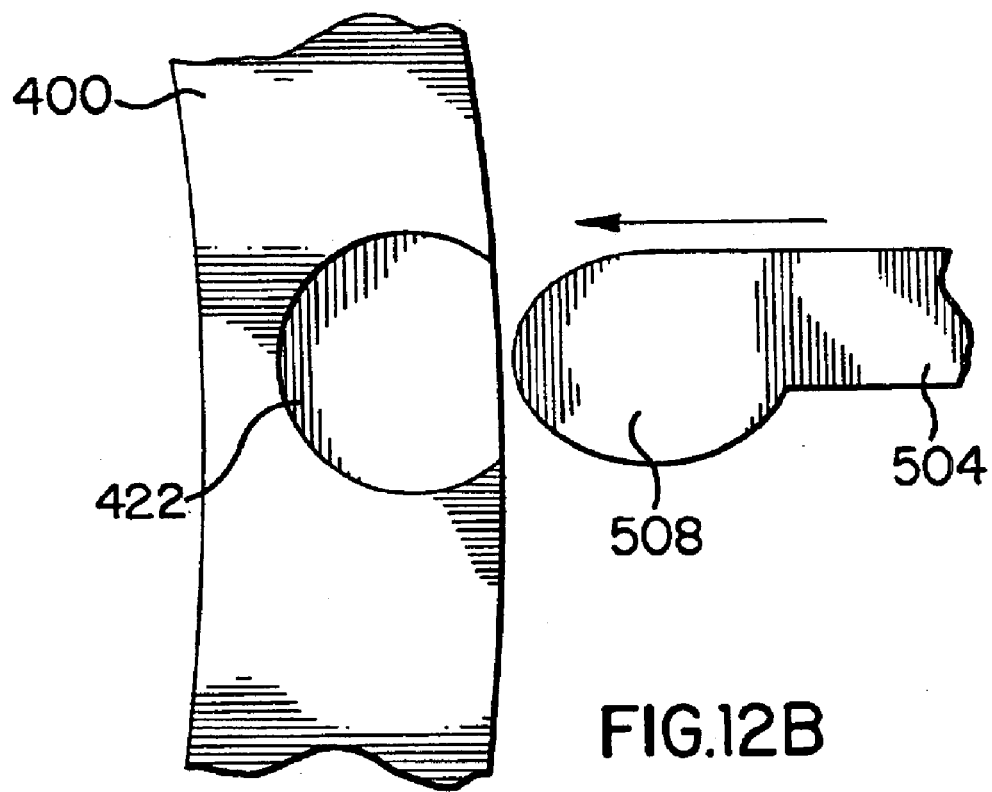
Figure 12C:
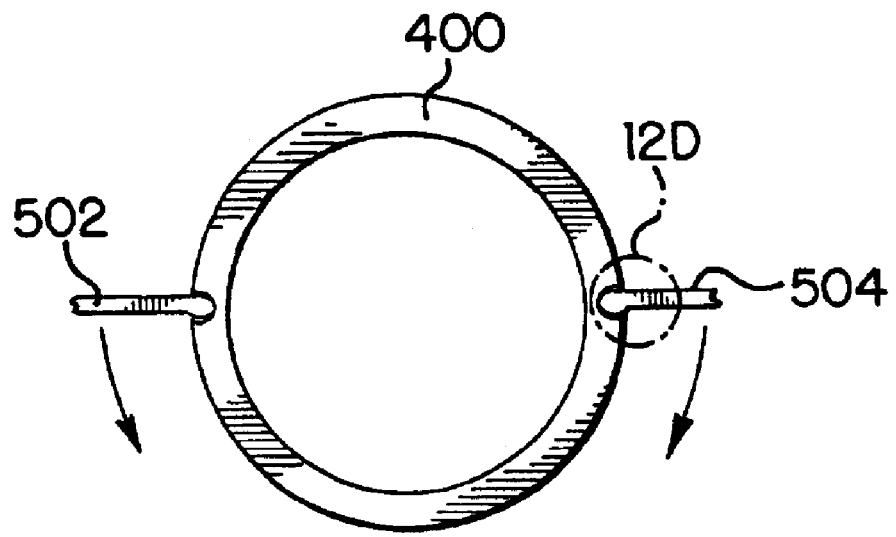
Figure 12D:
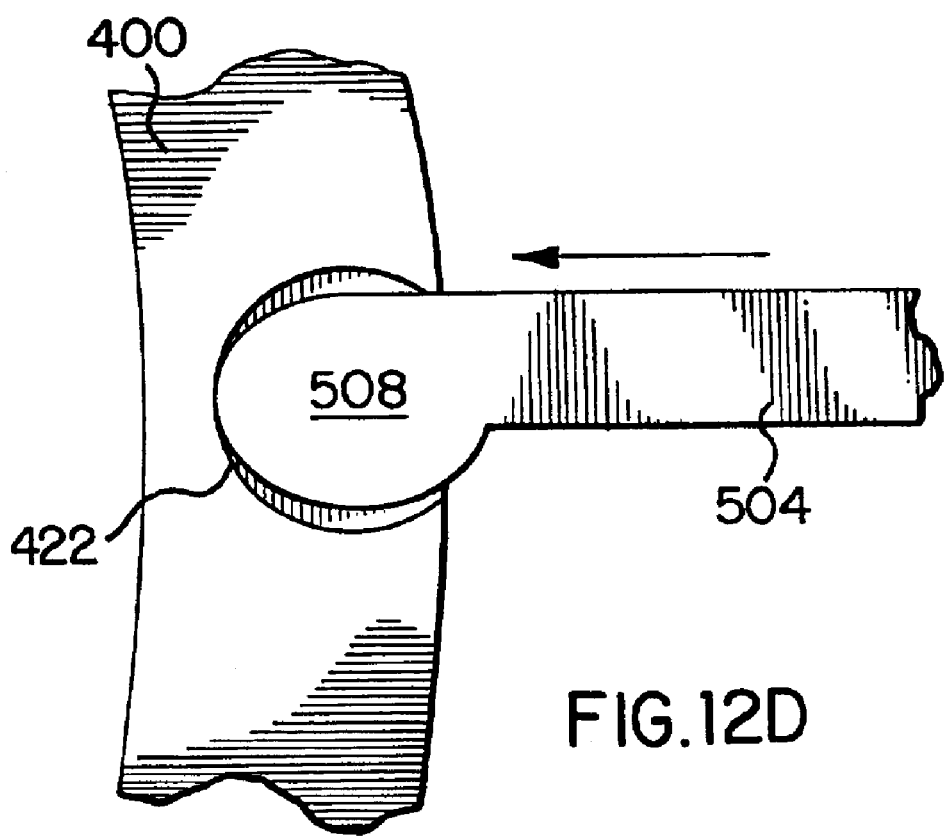
Figure 12E:
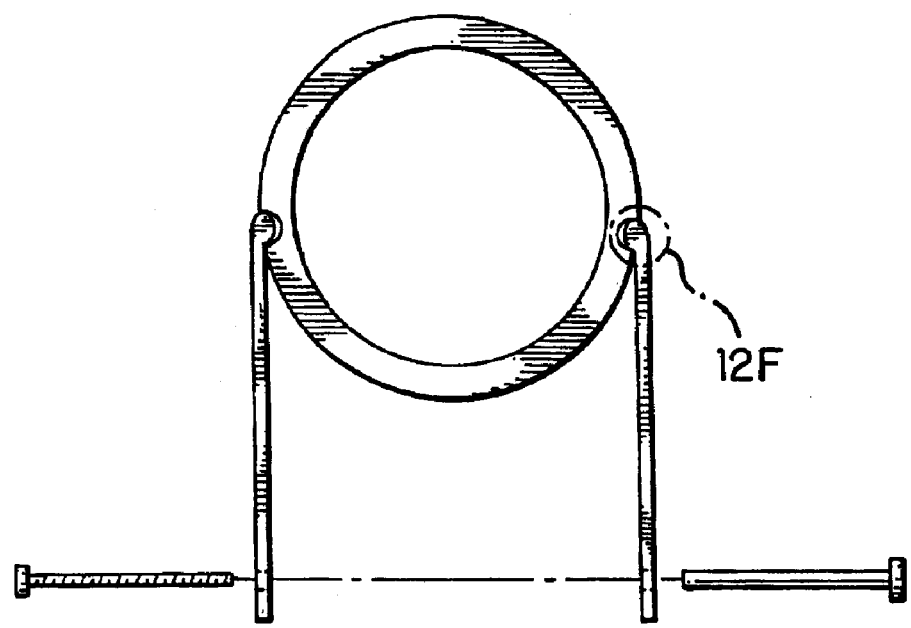
Figure 12F:
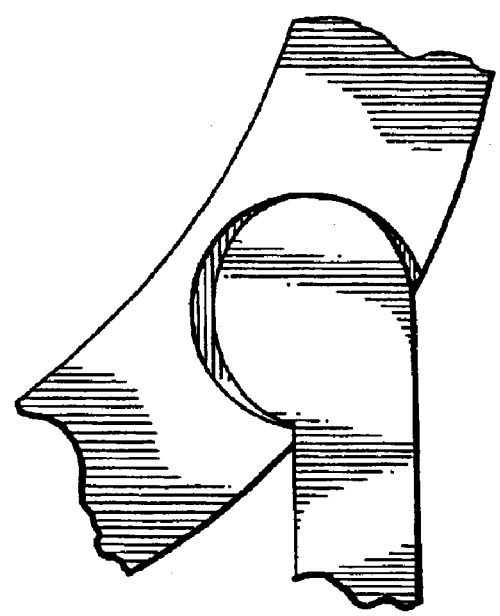
Figure 12G:
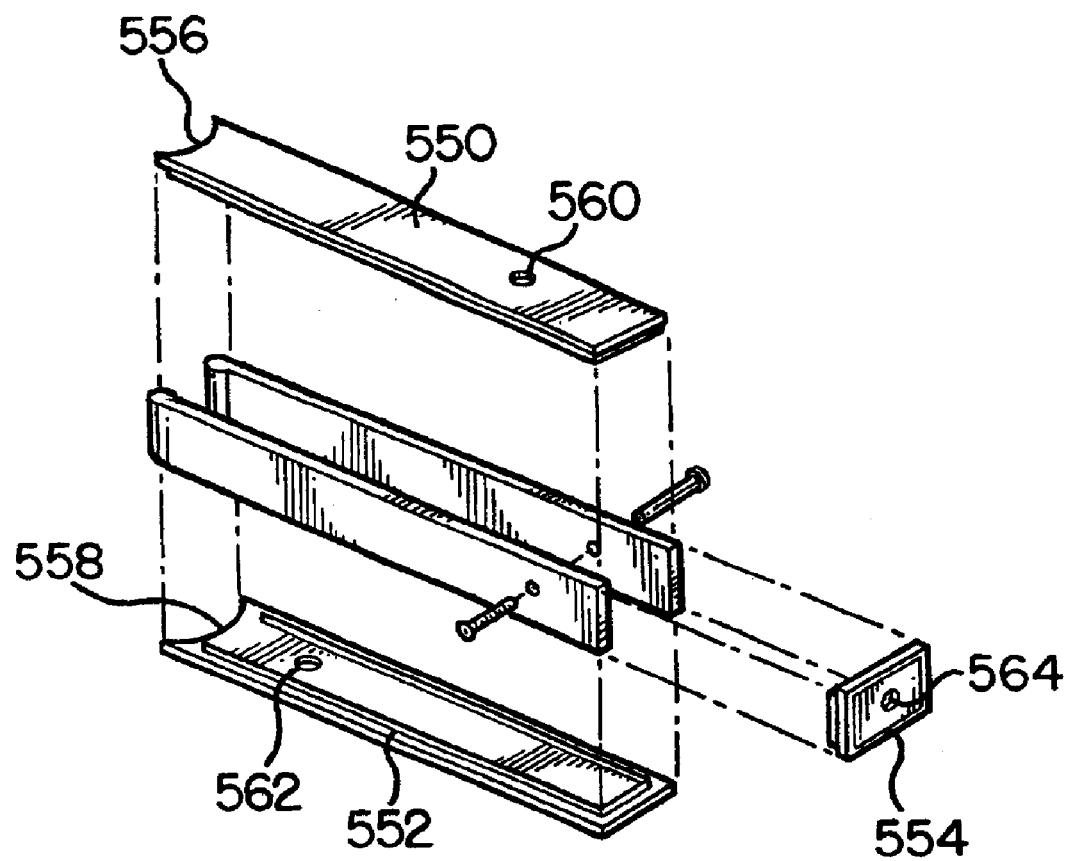
FIG. 12G is an exploded view of a bracket according to the invention.

The brackets 500 can include bracket covers that help to contain and conceal wires and enhance the appearance of the device. As shown in FIG. 12G, bracket 500 can include an upper cover 550, a lower cover 552, and a forward cover 554. The covers can be attached to the bracket 500 in any suitable way. The upper cover 550 and the lower cover 552 can have rounded end portions 556 and 558 respectively. These rounded end portions 556 and 558 allow the covers 550 and 552 to accommodate the curvature of the support member 400 when the bracket 500 is attached to the support member 400 (see FIG. 2 ). All of the bracket covers 550, 552; and 554 can have apertures 560, 562 and 564, respectively, located at any convenient location. These apertures provide access to the interior of bracket 500 and permit the entry and exit of wires from the interior of the bracket 500 to the exterior.

Figure 13:
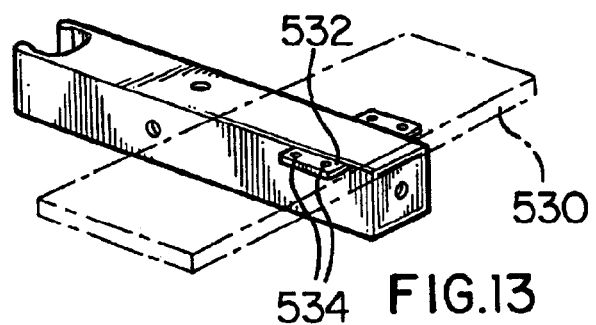
FIG. 13 is an embodiment of a bracket holding a keyboard tray according to the invention.

The bracket 500 can be used to support a variety of items and accessories. For example, as shown in FIG. 13, a bracket 500 is used to support a keyboard tray 530. The bracket 500 can include provisions for associating the bracket 500 to the keyboard tray 530. Preferably, a flange 532 mounted on one or both of the bracket arms 502 or 504 is used The flange 532 can include holes 534 which may be used in conjunction with suitable mechanical connectors to bolt or fasten the keyboard tray 530 to the bracket 500.

Figure 14:
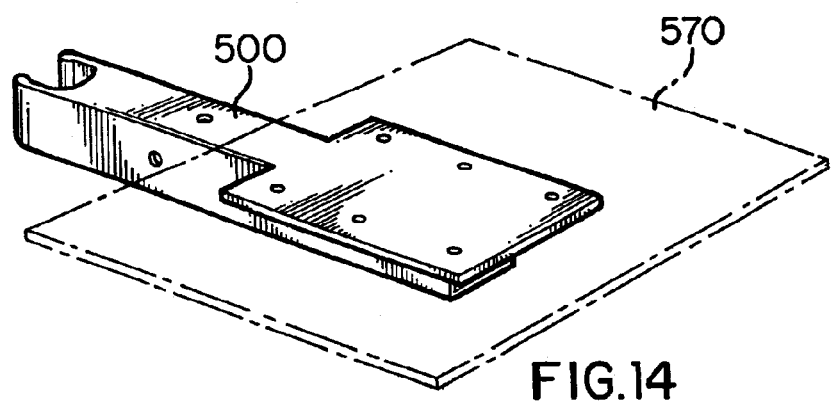
FIG. 14 is an embodiment of a bracket holding a platform according to the invention.
Figure 15:
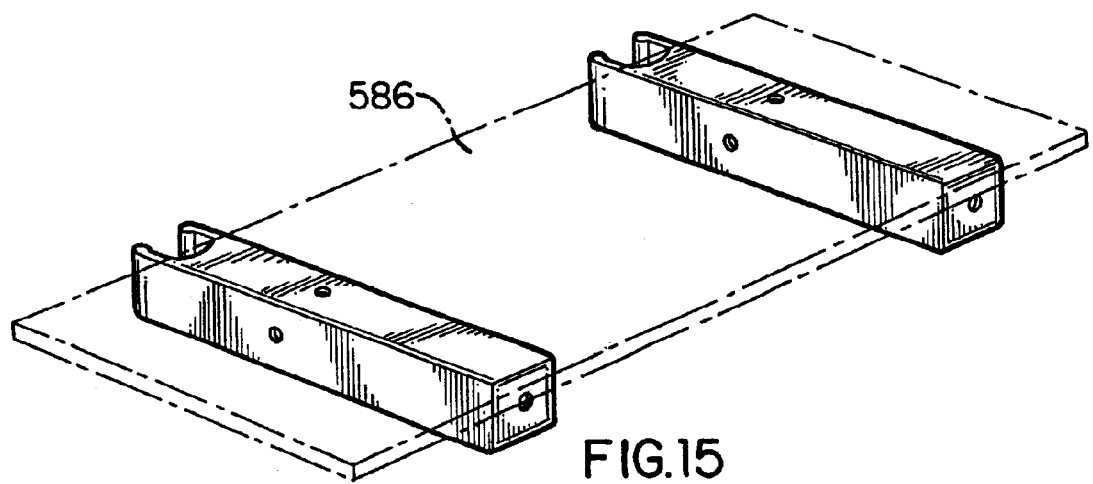
FIG. 15 is an embodiment of a bracket holding a shelf according to the invention.
Figure 16:
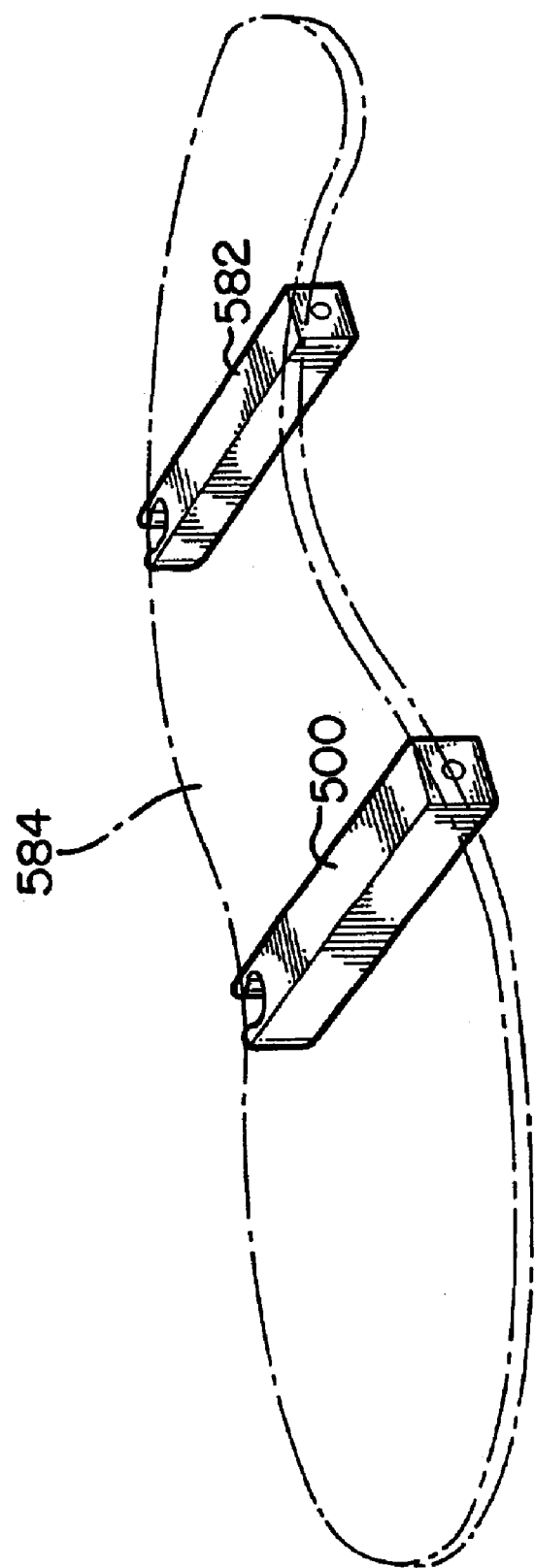
FIG. 16 is an embodiment of a bracket supporting a work surface according to the invention.

FIG. 14 shows a bracket 500 supporting a platform surface 570. The platform surface 570 can be of any size, including a suitable size to support a monitor or television. FIG. 16 shows two long brackets 580 and 582 which are used to support a table top surface 584. Obviously, because the bracket 500 can be of any suitable length, the bracket 500 can be made short enough to create a book shelf surface 586 (see FIG. 15).

Figure 17:
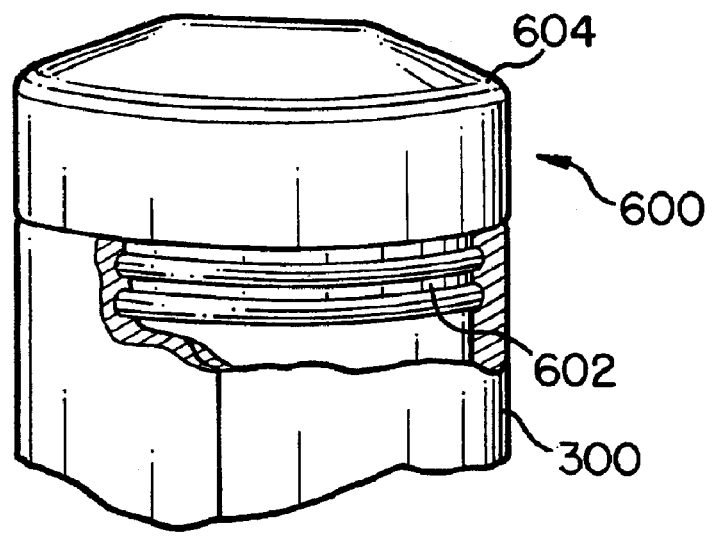
FIG. 17 is a cut away view of a cap according to the invention.

Caps can be placed at the top of a modular support and bases or feet can be placed at the bottom of a modular support. FIG. 17 shows a preferred cap 600. The cap 600 includes an inner end portion 602 designed to mate with the inner surface of a cover 300 or a support unit 400. The inner end portion 602 can be similar in design as the outer surface of the joining member 200. The outer end portion 604 can be any desired shape. The preferred rounded and cylindrical shape is shown in FIG. 17. Another possible embodiment of the outer end portion 604 is flat, as shown in FIGS. 1 and 1A. The flat design provides a convenient surface for lamps and other accessories, as shown in FIG. 1. The cap 600 can also include suitable mounting devices, such as bolt holes, slots, Velcro or magnets to assist in securely holding accessories placed on top of the cap 600. The cap 600 prevents dust and debris from entering into the interior of the modular support. The cap 600 also enhances the overall appearance of the modular support.

Figure 18:
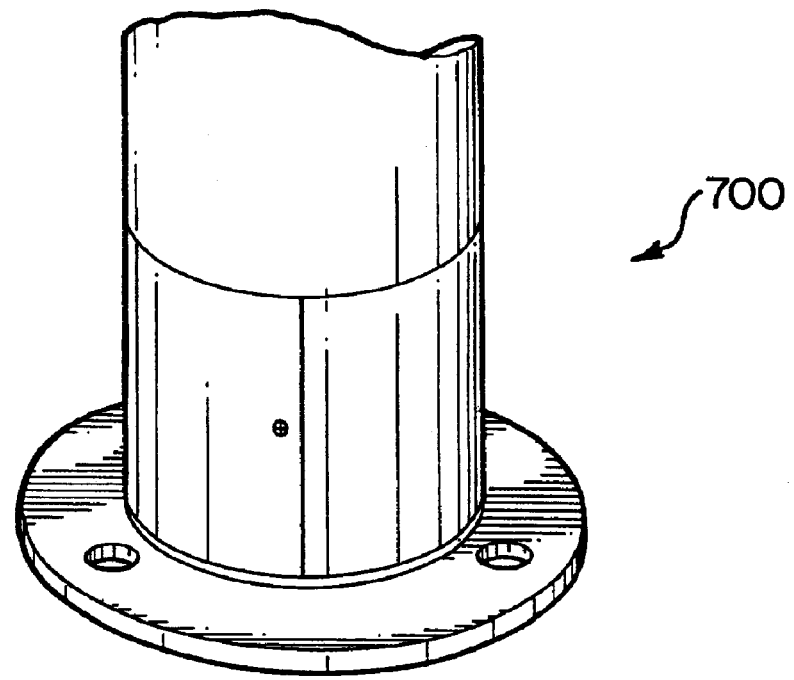
FIG. 18 is an isometric view of an attaching member according to the invention.
Figure 19:
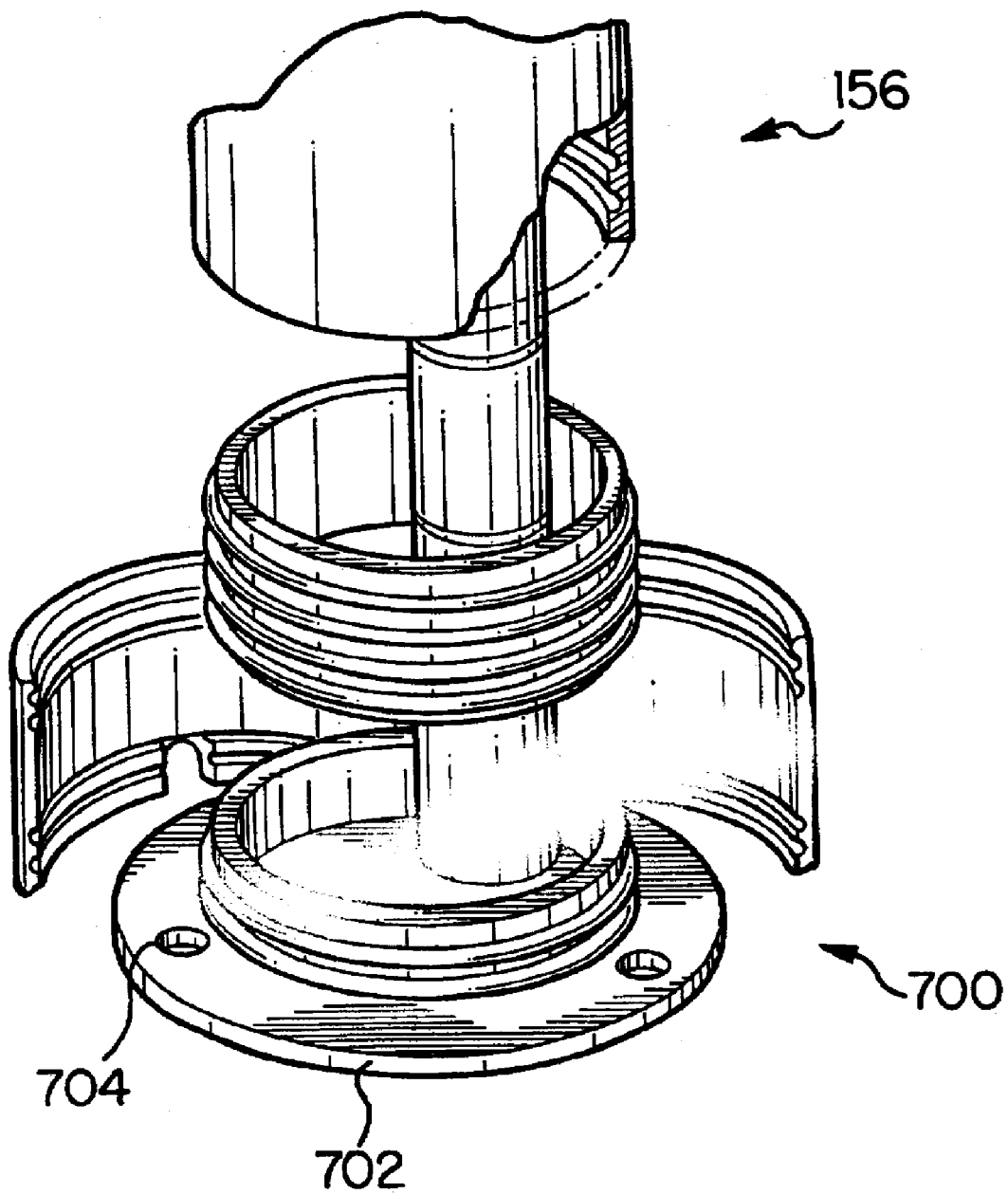
FIG. 19 is an exploded isometric view of an attaching member according to the invention.

Another possible component of the system is an attaching member. The attaching member, which can have any number of shapes or designs, is intended to join the modular support system to other items. A preferred design for the attaching member 700 is shown in FIGS. 18 and 19. The preferred attaching member 700, includes a flange 702. An exemplary embodiment of the attaching member 700 includes flange apertures 704 which are designed to receive fasteners (not shown). The fasteners are used to rigidly associate the flange 702, and thus the modular support system 156 to the desired item. Of course, flange apertures 704 are not needed if another type of attachment method is used, for example, an adhesive. The flange 700 also preferably includes provisions to interface with the rest of the system. The preferred interface is similar to that of the cap 600 or the support unit 400 previously described. The attaching member 700 can be used in a variety of ways. The following are some possible applications contemplated by the invention. The attaching member 700 could be used as a base for a hutch unit, which could include cabinets or shelves, that is supported over a desk surface. In this case, the attaching member 700 could be joined to the desk surface. Another possible application could be as a bottom mount of a shelf or platform. In this case, the attaching member 700 would be joined to the bottom of the shelf or platform and the shelf or platform would be used to support various items, such as a monitor, a telephone, or any other piece of equipment. The attaching member 700 could also serve as a foot or the very bottom of a modular support. If used in this application, the attaching member 700 could be joined to the floor, to prevent movement, or could be detached from the floor, thereby allowing movement.

Figure 20:
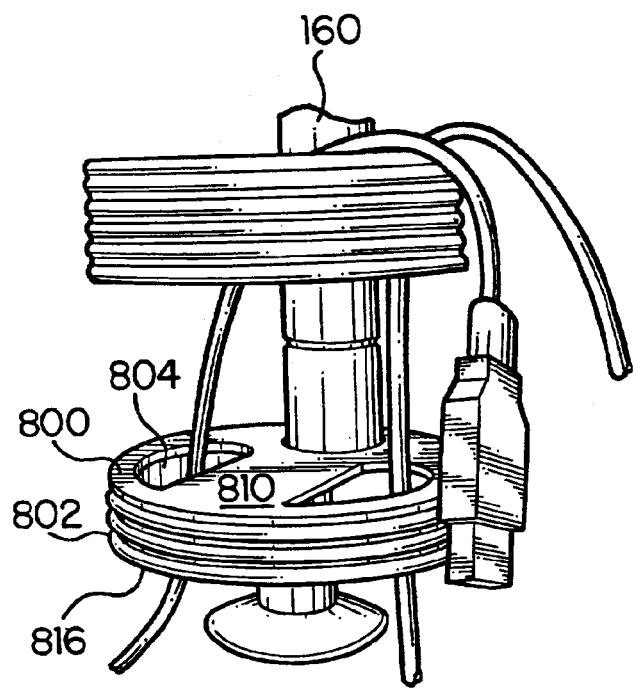
FIG. 20 is a top sometric view of a foot according to the invention.
Figure 21:
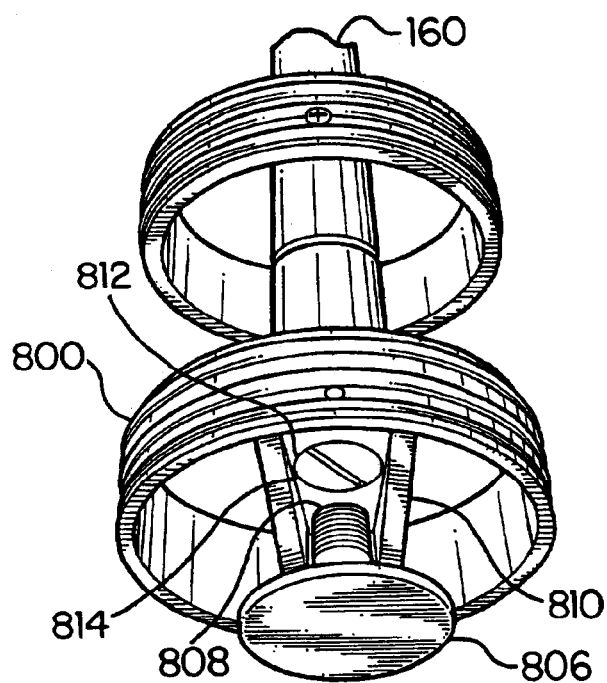
FIG. 21 is a bottom isometric view of a foot according to the invention.

The system can also include a base or foot. In addition to the wide base type foot 500 shown in FIG. 2, and the attaching member 700, shown in FIG. 19, other different configurations are also contemplated by the invention. FIGS. 20 and 21 show another preferred embodiment of the modular support system's foot. The preferred foot 800 includes provisions for managing wires, associating with the column 160 (see FIG. 2), and helping to level the modular support system.

Like other components which are a part of the modular support system, the preferred foot 800 includes a foot mating surface 802 which is designed to integrate with other components. Preferably, the mating surface 802 is designed to mate with a cover 300 (see FIG. 2) or any other component which has an interior mating surface. For comparison, a schematic representation of a joining member is shown above the foot 800. The joining member shown in FIGS. 20 and 21 is a schematic with some of the internal details omitted for clarity.

The preferred foot 800 includes at least one foot aperture 804. This aperture allows wires to enter and exit the interior of the system. In addition, the preferred foot 800 also includes an end piece 806. The end piece 806 is preferably threaded and attached to the foot 800 via a tapped hole 808. The tapped hole 808 is preferably formed in a spanning portion 810 of the foot 800. Spaced from the tapped hole 808, on spanning portion 810, the column hole 812 is used to attach the preferred foot 800 to the column 160. Although the tapped hole 808 can be placed anywhere along spanning portion 810 or at another location, a position near the center of foot 800 is preferred. The column 160 is preferably tapped and column fastener 814 preferably extends through column hole 812 and engages the tapped hole in column 160. The spanning portion 810 may be ribbed to provide additional strength.

Because the end piece 806 is threaded, the end piece 806 can be used as a conventional leveling device. The rotation of the end piece 806 allows the bottom of the system to assume different distances or clearances between the bottom of the system and the floor. The bottom of the system will usually be the axially lower portion 816 of foot 800, however, the lower portion of the cover could also be the bottom of the system if the bottom edge of the cover extends below the axially lower a portion 816 of foot 800. In any case, the end piece can 806 can be used to control the spacing between the bottom of the system and the floor. The invention prefers that a suitable clearance remain between the bottom of the system and the floor to allow wires to extend underneath the bottom of the system, as shown in FIG. 20.

This preferred arrangement for the foot 800 allows the wires to enter and exit the interior of the system by extending through aperture 804 and through a clearance created between the bottom of the system and the floor by an end piece 806 which also provides a leveling function.

The disclosed components comprise the basic building blocks of the invention Any of the various components can be used either singularly or with other components. Also, any of the features of the invention can be used alone or in combination with other features of the invention.

It will be apparent to those skilled in the art that various modifications and variations can be made in the modular support system of the present invention without departing from the spirit or scope of the invention. Thus, it is intended that the present invention cover the modifications and variations of this invention provided they come within the scope of the appended claims and their equivalents.

What is claimed is:

1. A joining member for use in a modular system for managing wires comprising:
    an inner portion having an inner surface adapted to engage a first element,
    an outer portion having an outer surface adapted to engage a second element,
    the outer surface being adapted to be enclosed by the second element, and
    wherein the joining member is capable of accommodating at least one wire radially inward of the outer surface and radially outward of the inner surface, and wherein the joining member further comprises an offset fastener to increase a radial squeezing force.

2. The joining member according to claim 1, wherein the first element is a column.

3. The joining member according to claim 1, wherein the inner surface defines a hole extending through the joining member.

4. The joining member according to claim 1, wherein a second hole disposed radially inward of the outer surface accommodates at least one wire.

5. The joining member according to claim 1, further comprising a hinge and a seam that permit the joining member to open and close.

6. The joining member according to claim 1, further comprising a rib disposed in the inner surface and protruding radially inward of the inner surface.

7. A joining member for use in a modular system for managing wires comprising:
    an inner portion having an inner surface adapted to engage a first element,
    an outer portion having an outer surface adapted to engage a second element,
    the outer surface being adapted to be enclosed by the second element, and
    wherein the joining member is capable of accommodating at least one wire radially inward of the outer surface and radially outward of the inner surface, the joining member further comprising a hinge and a seam that permit the joining member to open and close.

8. The joining member according to claim 7, wherein the first element is a column.

9. The joining member according to claim 7, wherein the inner surface defines a hole extending through the joining member.

10. The joining member according to claim 7, wherein a second hole disposed radially inward of the outer surface accommodates at least one wire.

11. The joining member according to claim 7, further comprising an offset fastner.

12. The joining member according to claim 7, further comprising a rib disposed in the inner surface and protruding radially inward of the inner surface.

* * * * *